3,002,989
METHOD OF STABILIZING ORGANOSILICON FLUIDS
Richard W. Awe and Harry M. Schiefer, Midland, Mich., assignors to Dow Corning Corporation, Midland, Mich., a corporation of Michigan
No Drawing. Filed Mar. 9, 1959, Ser. No. 797,849
1 Claim. (Cl. 260—448.2)

This invention relates to a novel method of preparing organosilicon compositions of improved thermal stability.

It was known prior to this invention that organosilylferrocene derivatives could be used as antioxidants in organopolysiloxanes. This is shown in U.S. Patent 2,831,880. Heretofore however, the ferrocene derivatives have been merely added to the organopolysiloxanes without any preconditioning of the mixture prior to use. Whereas the mere addition of ferrocene derivatives to siloxanes does give some improvement in thermal stability, the resulting compositions show little improvement when the temperature exceeds 500° F.

Applicants have discovered most unexpectedly that the oxidation stability of siloxanes containing organosilylferrocene derivatives can be vastly improved if the composition is pre-oxidized before use. Consequently it is the object of this invention to provide a method of increasing the thermal life of organopolysiloxane fluids. Another object is to provide improved organosiloxane fluids for use as lubricants. Other objects and advantages will be apparent from the following description.

This invention relates to a method of preparing a siloxane fluid which comprises heating a mixture of (1) a trimethylsiloxy endblocked siloxane fluid in which the substituents along the chain are phenyl, methyl and halophenyl radicals, (2) a compound of the group mono- and bis-trimethylsilylferrocene and (3) oxygen, at a temperature above 400° F. for at least 15 minutes.

In the process of this invention it is essential that the mixture of the siloxane, the ferrocene derivatives and oxygen be heated at a temperature above 400° F. and preferably from 450 to 600° F. This heating step is known as "the preoxidation" process. If desired higher temperatures may be employed. Obviously the temperature should be below that at which decomposition of the siloxane will occur. The precise time of heating is not critical although heating for less than 15 minutes shows little improvement. Precautions should be taken during the preoxidation step to prevent escape of the ferrocene derivative from the fluid. This can be prevented by heating in a container equipped with a condenser.

In general the time of heating is sufficient when the color of the mixture changes from light amber to maroon. When this point is reached further heating does not substantially improve the stability of the fluid. In general it has been found that heating from 2 to 4 hours at 500° F. is sufficient in the preoxidation process. It should be understood that for any fluid the lower the temperature the longer the time and the higher the temperature the shorter the time required for the preoxidation process.

In carrying out the process of this invention the siloxane fluid and the ferrocene derivative may be mixed in any convenient manner. The proportion of ferrocene derivative is not critical, that is there is an improvement in oxidation stability regardless of amount of iron present. In general the more iron present, the greater the oxygen stability of the fluid. Ordinarily satisfactory results are obtained when the ferrocene derivative is employed in amount such that the percent by weight iron is from .006 to .07% based on the weight of the siloxane fluid.

The chemical nature of the reaction products that occur during the preoxidation process is not known. It is assumed from their properties that they are either reaction products of the ferrocene derivative and the siloxane in which the iron atoms are attached to the siloxane molecules, or they are solutions of iron (in some form) in the siloxane fluid.

The oxygen may be mixed with the siloxaneferrocene composition by any suitable means. This can be accomplished, for example, by bubbling oxygen through the siloxane fluid, alternatively a thin film of the mixture of siloxane and ferrocene derivative can be exposed to oxygen. For example the siloxane can be caused to flow down a heated packed column containing an inert material such as glass, while oxygen passes in the opposite direction. Under these conditions the thin film of siloxane flowing over the glass packing will be sufficiently well mixed with oxygen to carry out the process of this invention. This method is suitable for continuous preoxidation of the siloxane.

It should be understood that the term "oxygen" as employed herein included pure oxygen together with air and other mixtures of oxygen with inert gases such as helium, argon and the like.

The ferrocene derivatives employed herein are known materials and may be prepared by the method shown in U.S. Patent 2,831,880, or in the copending application of Dietmar Seyferth, Serial No. 750,058, filed June 30, 1958, now abandoned. In general the process involves reacting ferrocene with an organo metallic compound such as amyl sodium or butyl lithium, to form the organometallic derivative of ferrocene. This intermediate is then reacted with trimethylchlorosilane. Even when a large excess of chlorosilane is employed one always obtains a mixture of the bis-trimethylsilylferrocene and the monotrimethylsilylferrocene. The two products can be separated by distillation under reduced pressure.

The siloxanes employed in this invention are fluid trimethylsilyl endblocked siloxanes. The remaining silicon atoms in the siloxane can be substituted with phenyl, methyl or halophenyl radicals. It has been found that the proper functioning of the compositions of this invention depends upon the trimethylsilyl groups on the ends of the chains. Thus all of the phenyl and halophenyl substituents on the silicon should be along the chain.

Specific examples of siloxane units in the fluids of this invention are trimethylsiloxane units, dimethylsiloxane units, phenylmethylsiloxane units, diphenylsiloxane units, chlorophenylmethylsiloxane units, bromophenylmethylsiloxane units, iodophenylmethylsiloxane units and bis-chlorophenylsiloxane units. In addition the siloxane fluids can contain monoorganosiloxane units of the formula $RSiO_{3/2}$ in which R can be methyl, phenyl or halophenyl. The fluids can also contain $SiO_2$ units.

The compositions produced by the method of this invention are particularly adaptable for use as high temperature lubricants, greases, hydraulic fluids, heat transfer fluids and for use as heating baths for sterilizing surgical instruments.

The following examples are illustrative only and should not be construed as limiting the invention which is properly delineated in the appended claim.

*Example 1*

The composition employed in this invention was a mixture of .2% by weight bis(trimethylsilyl)ferrocene and 99.8% by weight of a 50 cs. fluid copolymer of trimethylsiloxane, dimethylsiloxane and monomethylsiloxane. This composition was divided into three sections.

Sample 1 was given no pretreatment.
Sample 2 was heated 4 hours at 500° F. under a condenser in the absence of air.
Sample 3 was heated 4 hours at 500° F. under a condenser while air was passed through at the rate of 4 liters of air per hour, per 80 g. of sample.

35 g. of each of the samples were placed in a 150 ml. beaker in an air circulating oven at a temperature of 550° F. The heating was continued until the sample gelled. Based upon this test the gel times for the samples were as follows:

Sample 1 _____ 24 hours
Sample 2 _____ 44 hours
Sample 3 _____ greater than 1200 hours

Example 2

2% by weight bis(trimethylsilyl)ferrocene based on the weight of the siloxane was mixed with a 80 cs. fluid copolymer comprising a trimethylsilyl endblocked copolymer of phenylmethylsiloxane and dimethylsiloxane containing 25 mol percent of the phenylmethylsiloxane. The composition was divided into three samples and treated as follows:

Sample 1 had no preconditioning.
Sample 2 was heated 4 hours at 500° F. under a condenser in the absence of air.
Sample 3 was heated 4 hours at 500° F. under a condenser while air was passed through at the rate of 4 liters per hour per 80 g. of fluid.

Each of these samples were then subjected to the following test:

The 550° F. gel test was carried out by heating 35 g. of the composition in a 150 ml. beaker in an air circulating oven at the stated temperature.

The 600° F. gel test was carried out by heating 1 g. of the sample in an aluminum dish on a hot-plate which had a surface temperature of 600° F.

The 700° F. gel test was run by placing 1 g. of the composition in an aluminum dish in an air circulating oven operating at 700° F.

The gel time for each sample in each test is shown in the table below:

| Sample No. | Gel Time in Hrs., 550° F. | Gel Time in Hrs., 600° F. | Gel Time in Hrs., 700° F. |
|---|---|---|---|
| 1 | 120 | .83 | .25 |
| 2 | 216 | .66 | .33 |
| 3 | 500 | 406 | 16.5 |

Example 3

.1% by weight mono(trimethylsilyl)ferrocene was added to the siloxane of Example 2, the mixture was then tested as shown in that example with the following results:

Gel time, hours
550° F. _____ 432
600° F. _____ 8–23
700° F. _____ 1.33

Example 4

Results equivalent to those of Example 2 are obtained when .4% by weight bis(trimethylsilyl)ferrocene is mixed with a fluid copolymer of trimethylsiloxane, chlorophenylmethylsiloxane and phenylmethylsiloxane, and the mixture is preconditioned in accordance with the method of Example 2.

That which is claimed is:

A method of preparing a siloxane fluid having increased stability to oxidation which comprises heating a mixture of (1) a trimethylsiloxy endblocked organosiloxane fluid in which the organic substituents along the chain are of the group consisting of phenyl, methyl and halophenyl radicals, (2) a compound of the group consisting of mono- and bis-trimethylsilylferrocene and (3) oxygen, at a temperature above 400° F. for at least 15 minutes.

References Cited in the file of this patent
UNITED STATES PATENTS
2,831,880    Benkeser _____ Apr. 22, 1958
FOREIGN PATENTS
799,067    Great Britain _____ July 30, 1958

UNITED STATES PATENT OFFICE
CERTIFICATE OF CORRECTION

Patent No. 3,002,989                      October 3, 1961

Richard W. Awe et al.

It is hereby certified that error appears in the above numbered patent requiring correction and that the said Letters Patent should read as corrected below.

Column 3, line 19, for "2%" read -- .2% --.

Signed and sealed this 10th day of April 1962.

(SEAL)
Attest:

ERNEST W. SWIDER                      DAVID L. LADD
Attesting Officer                         Commissioner of Patents